US006809779B2

United States Patent
Chang et al.

(10) Patent No.: US 6,809,779 B2
(45) Date of Patent: Oct. 26, 2004

(54) SYSTEM AND METHOD FOR AUTOMATICALLY CONFIGURING REMOTE CONTROL DEVICE USING REMOVABLE STORAGE MEDIA

(75) Inventors: Matthew Chang, San Diego, CA (US); Greg Gudorf, San Diego, CA (US); Aaron Dew, San Diego, CA (US); Anthony Lionel Creed, San Diego, CA (US); Rolf Toft, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 488 days.

(21) Appl. No.: 10/000,782

(22) Filed: Oct. 29, 2001

(65) Prior Publication Data
US 2003/0107684 A1 Jun. 12, 2003

(51) Int. Cl.[7] ................................................. H04N 5/44
(52) U.S. Cl. ................... 348/734; 348/552; 340/825.72
(58) Field of Search ................................. 348/734, 552, 348/569; 725/133, 142, 151; 710/11, 10, 8, 13; 340/825.22, 825.72, 825.69, 825.73, 825.75; 398/112

(56) References Cited

U.S. PATENT DOCUMENTS

| | | | | |
|---|---|---|---|---|
| 5,341,166 A | * | 8/1994 | Garr et al. | 725/153 |
| 6,157,319 A | * | 12/2000 | Johns et al. | 340/825.72 |
| 6,223,348 B1 | * | 4/2001 | Hayes et al. | 725/152 |
| 6,407,779 B1 | * | 6/2002 | Herz | 348/734 |
| 2001/0033243 A1 | * | 10/2001 | Harris et al. | 341/176 |
| 2002/0097165 A1 | * | 7/2002 | Hulme | 340/825.72 |
| 2002/0174270 A1 | * | 11/2002 | Stecyk et al. | 710/1 |
| 2003/0061604 A1 | * | 3/2003 | Elcock et al. | 717/170 |
| 2003/0066080 A1 | * | 4/2003 | Kamieniecki | 725/80 |

* cited by examiner

Primary Examiner—Victor R. Kostak
(74) Attorney, Agent, or Firm—John L. Rogitz

(57) ABSTRACT

A system and method for allowing a viewer to easily program a remote control device with the parameters of various home entertainment components such as TVs, VCRs, DVDs, etc. A removable media is inserted into each component, with the remote control parameters or model identification of the component being downloaded to the media. The media is then removed from the component and inserted into the remote control device, which uploads the model data or control parameters so that the remote control device can be used to control the component without requiring a person to manually set or configure, for each component, the "universal" master remote.

25 Claims, 1 Drawing Sheet

SYSTEM AND METHOD FOR AUTOMATICALLY CONFIGURING REMOTE CONTROL DEVICE USING REMOVABLE STORAGE MEDIA

BACKGROUND OF THE INVENTION

1. Field of the Invention

The present invention relates generally to home entertainment systems and remote controls.

2. Description of the Related Art

Currently, a viewer of a home entertainment system that can include several components including a TV, DVD player, VCR, personal video recorder (PVR), and so on, can control each component using a remote control device. Unfortunately, each component typically comes with its own remote control device; to permit the use of a single device, a user must manually program the remote control device with the various parameters necessary to control the multiple system components. This is cumbersome and tedious.

SUMMARY OF THE INVENTION

A method for automatically programming a home entertainment system remote control device to control plural system components includes engaging a portable storage media with a component, and loading control parameters of the component onto the media. The method further includes disengaging the media from the component, engaging the media with the remote control device, and then loading the control parameters into the remote control device.

Preferably, the media is engaged with the component by inserting the media into the component. In one non-limiting embodiment, the media is flash memory. The component can be selected from the group of components including but not limited to televisions, VCRs, PVRs, DVD players, CD players, cassette decks, and A/V amplifiers.

In another aspect, a TV system includes a TV, a component coupled to the TV, and a remote control device that stores control parameters related to the component and the TV. Means are provided for automatically transferring control parameters between the component and the remote control device. The transferring means can include a removable flash memory or a transmitter on the component that sends, via wireless link, control parameters to the remote control device.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

Figure 1:
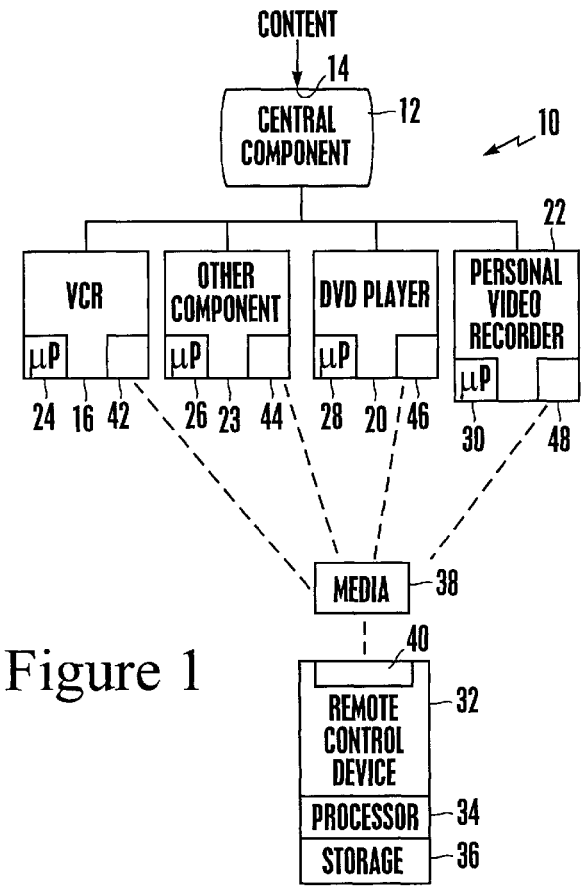
FIG. 1 is a block diagram of an exemplary embodiment of the system of the present invention.

Referring initially to FIG. 1, a system is shown, generally designated 10. As shown, the system 10 includes a central home entertainment system component 12, typically an audio/video receiver such as but not limited to an A/V amplifier or a TV that conventionally receives content at a content receiver 14 (e.g., an antenna, satellite dish, set-top box, audio receiver associated with a CD player or cassette deck, etc.).

Various video and audio source components can be associated with the central component 12. As examples, a video cassette recorder (VCR) 16, digital video disk (DVD) player 20, a personal video recorder (PVR) 22 such as a Sony TiVO®, and other audio and/or video device 23 such as a cassette deck or "minidisk" or CD player, etc., can all communicate with the central component 12 via wired or wireless links to play and/or record content on the central component 12 or to otherwise process signals from the central component 12. Each component 16, 23, 20, 22 can have a respective processor 24, 26, 28, 30 that executes appropriate parts of the logic discussed below. Alternatively, the components may have non-volatile memory which is accessible via the removable media interface.

While the embodiment of FIG. 1 shows a central component 12 with a single housing and separated from the components 16, 23, 20, 22, it is to be understood that the term "television" encompasses any apparatus that has a television tuner and the below-described functionality in a single housing or in separate housings that cooperate together. For instance, the term "TV" encompasses the television system shown in FIG. 1, as well as a conventional television in combination with a set-top box that functions in accordance with the present invention. The term "TV system" can include the embodiment shown in FIG. 1 as well as a system that houses the TV or an A/V amplifier along with one or more of the components 16, 23, 20, 22 in a single housing.

One or more viewer input devices, such as but not limited to a wireless TV remote control device 32, can be used to control the central component 12 and components 16, 23, 20, 22 in accordance with TV remote control principles known in the art. The remote control device 32 includes a processor 34 that executes part of the logic described below, as well as a data storage 36.

As shown in FIG. 1, the system 10 also includes removable memory media 38. The media 38 can be flash memory, and can be embodied by, e.g., a Sony Memory Stick® or Smart File® which is removably engageable with a slot 40 in the remote control device 32. Moreover, the media 38 is removably engageable with respective slots 42, 44, 46, 48 in the components 16, 23, 20, 22. It can also be engaged with the central component 12 in accordance with present principles.

Figure 2:
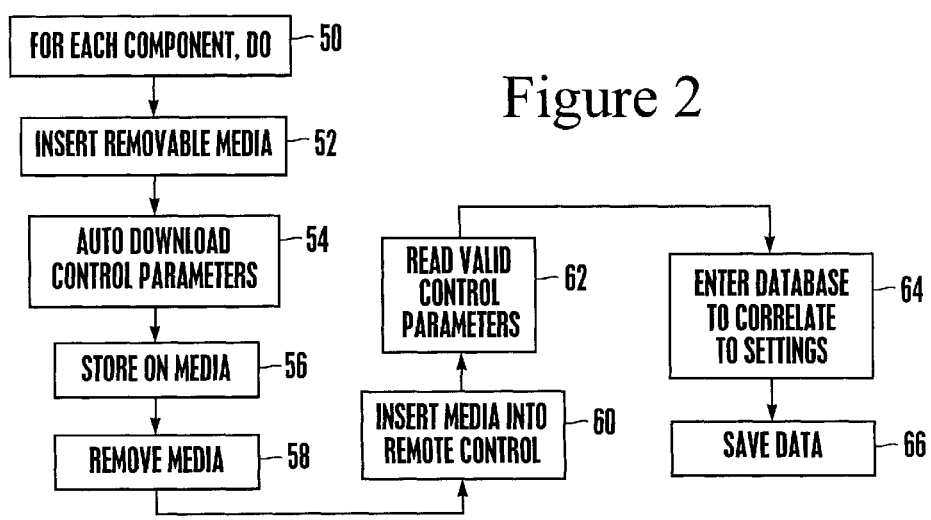
FIG. 2 is a flow chart of the inventive logic herein.

The microprocessors/processors disclosed herein execute the logic set forth in FIG. 2. The microprocessors/processor can access data storages such as the data storage 36 in the remote control device 32 that are contained in computer memory, or on a hard disk drive, optical drive, solid state storage, tape drive, removable flash memory, or any other suitable data storage medium and potentially accessible to a network such as the Internet.

It is to be understood that the microprocessors disclosed herein function in accordance with the logic below. The flow charts herein illustrate the structure of the logic modules of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer or microprocessor) to perform a sequence of function steps corresponding to those shown. Internal logic could be as simple as a state machine.

In other words, the present logic may be established as a computer program that is executed by a processor within, e.g., the present microprocessors/processors or indeed within the removable media 38 itself as a series of computer-executable instructions. In addition to residing on hard disk drives, these instructions may reside, for example, in RAM of the appropriate computer, or the instructions may be stored on magnetic tape, electronic read-only memory, or other appropriate data storage device.

FIG. 2 shows the present logic. Commencing at block 50, the ensuing logic is followed for each component sought to be controlled using the remote control device 32. The media 38 is inserted into the respective slot 42, 44, 46, 48 of the component 16, 23, 20, 22. The respective microprocessor 24, 26, 28, 30 then downloads, at block 54, necessary control parameters to the media 38, which stores the data at block 56. Or, the identification of the component, e.g., component type, model number, etc., need simply be downloaded. Alternatively, a processor onboard the media 38 can undertake this function. The control parameters can include, e.g., IR remote control codes, control settings, etc. The media 38 is then removed from the component at block 58.

Proceeding to block 60, the media is inserted into the slot 40 of the remote control device 32. The processor 34 in the device 32 reads, i.e., uploads, the control parameters into the storage 36 in the remote control device 32 at block 62. Alternatively, a processor onboard the media 38 can undertake this function. When the component identification is being used, the identification is correlated to control parameters at block 64 by entering a database with the ID and correlating the ID to the required parameters. The data can be saved for access by the appropriate processor at block 66. This can be done for each component 16, 23, 20, 22 (and for the central component 12 if necessary) such that the remote control device 32 subsequently can be used to control the central component 12 and components 16, 23, 20, 22 without requiring the viewer to manually input a plethora of control parameters into the device 32. Moreover, multiple remote control devices can be quickly and easily programmed by engaging the media 38 with the devices.

While the particular SYSTEM AND METHOD FOR AUTOMATICALLY CONFIGURING REMOTE CONTROL DEVICE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A method for automatically programming a master remote control device to control at least one component associated with a home entertainment system, comprising:
   engaging a storage media with the component;
   loading at least one control parameter from the component onto the media;
   disengaging the media from the component;
   engaging the media with the master remote control device; and
   loading the control parameter into the master remote control device.

2. The method of claim 1, wherein the media is engaged with the component by inserting the media into the component.

3. The method of claim 1, wherein the media includes flash memory.

4. The method of claim 1, comprising loading plural control parameters onto the media.

5. The method of claim 1, comprising engaging the media with plural components such that control parameters from plural components can be loaded into the remote control device.

6. The method of claim 1, wherein the component is selected from the group of components including VCRs, PVRs, DVD players, and A/V amplifiers.

7. A TV system, comprising:
   at least one TV;
   at least one component coupled to the TV;
   at least one hand-held master remote control device storing control parameters related at least to the component and TV, the master remote control device being manipulable by a viewer to wirelessly send control signals at least to the component and to the TV; and
   at least one removable media removably engageable with the master remote control device and component.

8. The system of claim 7, wherein the component includes a receptacle for engaging the media.

9. The system of claim 7, wherein the media includes flash memory.

10. The system of claim 7, wherein plural control parameters are loaded onto the media.

11. The system of claim 7, wherein the media is configured for engaging plural components such that control parameters from plural components can be loaded into the remote control device.

12. The system of claim 7, wherein the component is selected from the group of components including VCRs, PVRs, DVD players, and A/V amplifiers.

13. A TV system, comprising:
   at least one TV;
   at least one component coupled to the TV;
   at least one hand-held master remote control device storing control parameters related at least to the component and TV, the master remote control device being manipulable by a viewer to wirelessly send control signals at least to the component; and
   means for automatically transferring control parameters between the component and the master remote control device.

14. The system of claim 13, wherein the means for transferring is a removable media device engageable with the remote control device and the component.

15. The system of claim 14, wherein the component includes a receptacle for engaging the media.

16. The system of claim 14, wherein the media includes flash memory.

17. The system of claim 14, wherein plural control parameters are loaded onto the media.

18. The system of claim 14, wherein the media is configured for engaging plural components such that control parameters from plural components can be loaded into the remote control device.

19. The system of claim 13, wherein the component is elected from the group of components including VCRs, PVRs, DVD players, and A/V amplifiers.

20. The method of claim 1, wherein the parameter is an IR remote control code.

21. The system of claim 7, wherein the parameter is an IR remote control code.

22. The system of claim 13, wherein the parameter is an IR remote control code.

23. The method of claim 1, wherein the parameter is component identification correlatable to settings of the remote control device.

24. The system of claim 7, wherein the parameter is component identification correlatable to settings of the remote control device.

25. The system of claim 13, wherein the parameter is a component identification correlatable to settings of the remote control device.

* * * * *